Dec. 3, 1968     R. L. SISSON     3,413,928
GEAR PUMP THRUST PLATE

Filed Dec. 21, 1966     3 Sheets-Sheet 1

*INVENTOR*
RONALD L. SISSON
BY
*Paul H. Gallagher*
ATTORNEY

Dec. 3, 1968   R. L. SISSON   3,413,928
GEAR PUMP THRUST PLATE

Filed Dec. 21, 1966   3 Sheets-Sheet 3

INVENTOR
RONALD L. SISSON
BY
*Paul H. Gallagher*
ATTORNEY

United States Patent Office 3,413,928
Patented Dec. 3, 1968

3,413,928
GEAR PUMP THRUST PLATE
Ronald L. Sisson, Jackson, Mich., assignor to Clark Equipment Company, a corporation of Michigan
Filed Dec. 21, 1966, Ser. No. 603,469
10 Claims. (Cl. 103—126)

ABSTRACT OF THE DISCLOSURE

Thrust plate for gear pump for sealing the gears therein, of bellows construction utilizing pressure of the pumped liquid, for minimizing fatigue of the bellows.

Cross references

Certain features of the construction disclosed herein are claimed broadly in the co-pending application of Sisson & Shreve, Ser. No. 603,467, filed Dec. 21, 1966, and assigned to the assignee of the present invention.

Disclosure

In gear pumps the matter of sealing the gears against leakage of the liquid has long presented many problems. Due to the differential in pressure as between the inlet and outlet, as well as the differential or gradient pressures as between successive gear tooth pockets, as well as other factors, sealing the gears has been difficult. The different pressures involved react against the thrust plate utilized for sealing the gears in such a way as to tend to prevent even sealing. If pressure is imposed on the thrust plate according to the minimum pressure of the liquid in the pump, there would be great leakage in connection with the greater pressures, while on the other hand if pressure were imposed on the thrust plate according to the greatest pressure involved, the wear on the thrust plate would be excessive. It has been found that a bellows type of thrust plate functions extremely well to overcome the problems stated. The bellows type thrust plate expands and contracts in response to the different pressures involved in the pumped liquid, including opposed diaphragm-like elements which move relatively away from and toward each other in the expanding and contracting movements. This movement of the bellows elements causes fatigue therein and although the material of which the elements are made are of good wear-resisting characteristics, they are nevertheless subject to damage by fatigue.

A broad object of the present invention therefore is to provide a novel thrust plate of bellows construction in which at least one element moves toward and from another for producing the expanding and contracting effects and which is constructed in such a way as to minimize fatigue of the movable element.

Another and more specific object is to provide a bellows construction of the character stated in which maximum flexing of the movable element takes place in arcuate portions thereof.

Other objects and advantages of the invention will appear from the following detail description taken in conjunction with the accompanying drawings in which.

Figure 1:
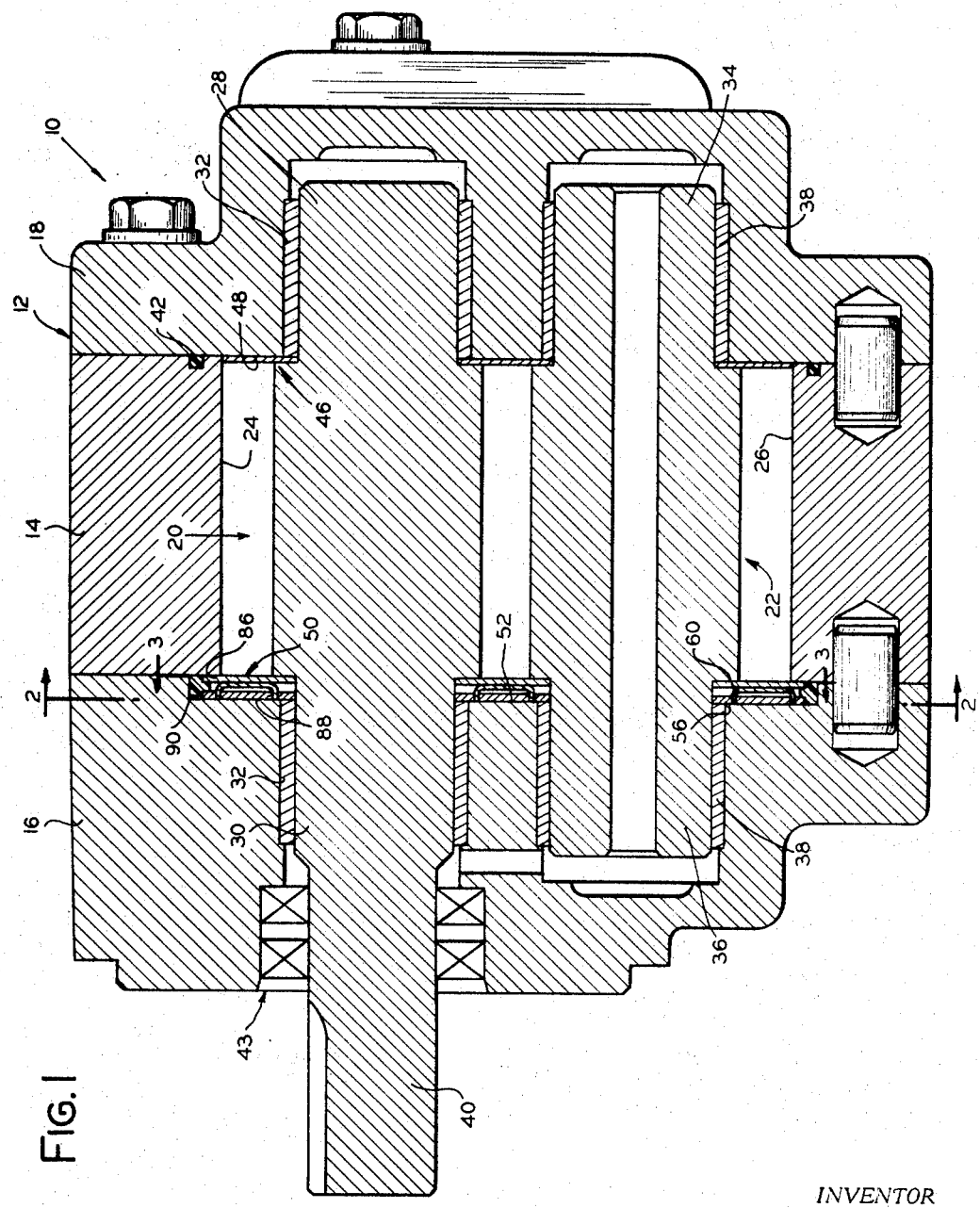
FIGURE 1 is a sectional view of a gear pump incorporating the thrust plate of the present invention, to show the orientation and use of the thrust plate, this view being taken in a plane containing the axes of the gears.

Referring in detail to the drawings, FIGURE 1 shows a gear pump indicated in its entirety at 10 and including a housing 12 made up of a central housing member 14, a front cover assembly 16, and a rear cover assembly 18. The pump includes a driving gear 20 and a driven gear 22 working in chambers 24 and 26. The gears have shaft elements, integral with the gears if desired, those of the gear 20 being indicated at 28 and 30, journalled in suitable bearings 32. The driven gear 22 has shaft elements 34 and 36 journalled in suitable bearings 38. The driving gear 20 also has a shaft extension 40 extending from the housing for connection with a suitable driving means. Suitable sealing gaskets 42 may be provided between the parts of the housing while another sealing means 43 seals the shaft extension 40 in the housing. The housing also defines an inlet passage 44 and an outlet passage 45.

At the rear end is a fixed thrust plate 46 between the gears and the inner face 48 of the rear cover housing 18. At the other end of the gears is a semi-fixed thrust plate 50 constituting the principal feature of the invention, this thrust plate being disposed between the gears and the inner face 52 of the front cover assembly 60. The specific assembly of the semi-fixed thrust place 50, as well as the detail construction thereof, will be described in detail hereinbelow.

Figure 2:
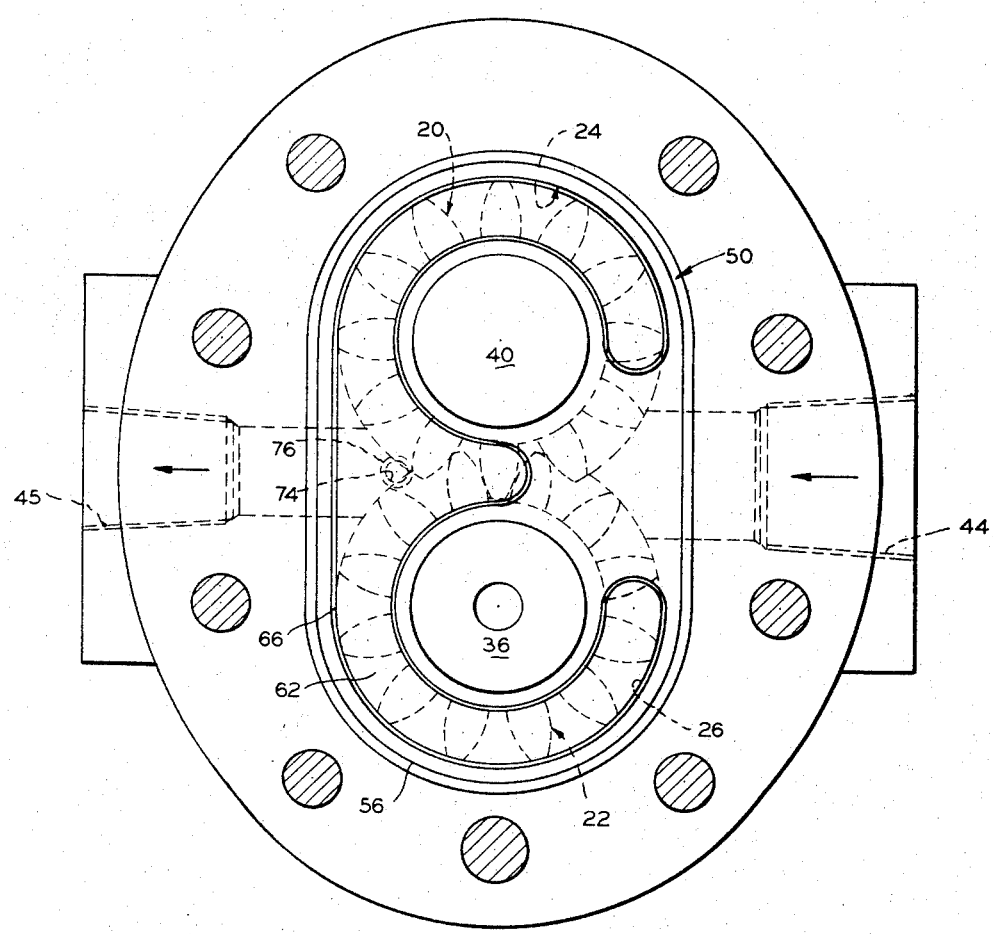
FIGURE 2 is an end view from the left of FIGURE 1 with the near cover assembly of the pump removed, and showing the thrust plate in face view as oriented according to the line 2—2 of FIGURE 1.
Figure 3:
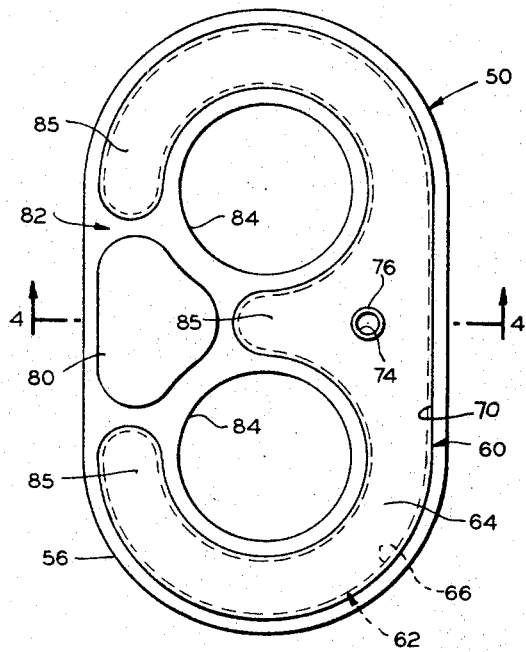
FIGURE 3 is a face view of the thrust plate from the opposite side of that shown in FIGURE 2, and oriented according to the plane of the line 3—3 of FIGURE 1.
Figure 4:
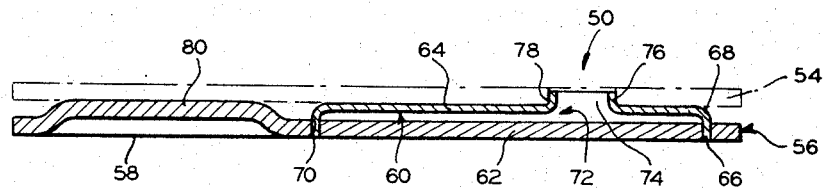
FIGURE 4 is a large scale sectional view taken at line 4—4 of FIGURE 3, and showing a wear plate in dot-dash lines.

FIGURE 2 shows the thrust plate 50 in face view, in the housing, while FIGURE 3 shows the thrust plate itself in face view from the side opposite that of FIGURE 2. The thrust plate 50 is utilized for sealing the gears and the chambers thereof, and is designed and constructed for applying pressures at certain predetermined areas of those chambers. To accomplish this purpose, the thrust plate is of bellows construction and such bellows construction broadly is disclosed and claimed in the co-pending application identified above. The present invention is directed to a specific construction of bellows.

The bellows thrust plate 50 includes a pressure plate 54 and a bellows member 56. The pressure plate 54 may be of suitable material such as steel-backed bronze and is relatively thick. The bellows member 56 includes a rigid backing member 58, a bellows element 60 and an insert backing element 62, this backing element serving as a portion of the backing plate 58 as described below. As described fully in the application identified above, the bellows construction has an internal pressure cavity which assumes a characteristic shape according to the pressures encountered in the gear chambers, these pressures progressively diminishing around the gears from the outlet passage to the inlet passage. That characteristic shape appears similar to a figure "3." In the present instance the pressure cavity is formed by the bellows element 60 (together with other elements) and, as viewed in FIGURES 2 and 3, the bellows element 60 assumes that same shape, as does the backing insert element 62.

Bellows elements are, of course, subjected to damage by fatigue even though this damage may be small. In the present instance, the bellows element 60 is so constructed that the flexing movements therein occur mostly in arcuate elements, thereby reducing the fatigue. The bellows element 60 includes a main top element 64 of substantially planar form having a size and configuration substantially defining the bellows element, surrounded by a continuous flange 66 formed at the marginal edge thereof, extending substantially perpendicular thereto. The flange 66 is so shaped as to produce an arcuate connecting or transition portion 68 between the flange proper and the top element 64 proper, this arcuate portion being of substantial radius in proportion to the depth of the flange. The backing plate 56 has an aperture dimensioned accurately to the flange and the insert element 62 is also accurately dimensioned to fit within the flange. The flange is positioned between and secured to the marginal edge of the aperture 70 and the insert element 62 by a press fit so that the backing plate 56 and the insert element 62 firmly grip the flange and bellows element whereby the backing plate and insert element form a rigid plate-like member holding and supporting the bellows element.

The bellows element 60 forms a single pressure cavity 72 which is continuous throughout the area of the bellows element. The top element 64 is provided with an aperture 74 surrounded by a flange 76 which is press fitted into another aperture 78 in the pressure plate 54. This aperture as pointed out in detail in the above-mentioned co-pending application is disposed at such location as to have constant communication with the outlet passage of the pump so as to provide for transmitting the pressure from the outlet passage into the pressure cavity 72. If desired, the backing plate 56 may be provided with an embossment 80 engaging the pressure plate 54 in the area 82 removed from the bellows element 64, so as to assist in maintaining the backing plate and pressure plate in uniform position. The backing plate 56 is of course provided with apertures 84 for receiving the shaft elements 30 and 36 and the bellows element has portions 85 extending a substantial distance around those apertures.

The thrust plate 50 is positioned in the pump (FIGURE 1) with the pressure plate 54 engaging the gears. The thrust plate is suitably shaped, preferably having rounded ends and straight sides, and is dimensioned preferably so as to extend beyond the gear chambers 24 and 26 in its long direction so as to overlie the central housing member 14 and engage the surface 86 thereof. The outer surface 88 of the thrust plate engages the opposed surface 90 of the front cover assembly 16. Upon expansion of the thrust plate, through the expansion of the bellows element 60, the pressure plate is forced against the gears throughout the end area of the gears, the thrust of the gears being transmitted to the opposite fixed thrust plate 46. This action of the thrust plate in sealing the gears is set out more fully in the co-pending application identified above.

The bellows element 64 may be made of any suitable material, strong and flexible, and is substantially thinner than the pressure plate 54. The backing plate 56 including the insert element 62 is also preferably of steel, and the materials of all of the elements are preferably such as to withstand attack by chemicals for example. Upon the expansion of the bellows element 60, the top element 64 remains nearly planar in shape, due to its full flat engagement with the pressure plate 54. Therefore, there is little or no flexing in that element, and since the flange 66 is retained in rigid position, as it is, the flexing movements take place in the arcuate portion 68 interconnecting the flange and the top element. The bending component of movement of the bellows element is manifested in the arcuate portion 68 and this fact minimizes any fatigue in the bellows element, due to the inherent characteristics of an arcuate shape. Accordingly the thrust plate of the invention is capable of expansion and contraction due to variations in pressure, and repeated expansions and contractions, with a minimum of fatigue, and provides a great improvement over other forms of bellows construction.

The transverse dimensions of the bellows element 60 (see particularly FIGURE 3) are such that that element is not gripped at its outer marginal edge between the front cover assembly 16 and the face 86 of the central housing member 14, although the element as a whole is gripped between the backing plate and the pressure plate. Due to the fact that it is not gripped at its outer marginal edge, it is more free to flex without fatigue, as contrasted with a construction in which the bellows element is generally flat and gripped at its marginal edge. In the present instance, the outer marginal edge, in the form of the perpendicular flange 66, is held or gripped in such perpendicular position so that the movements of the top element 64 in directions perpendicular to the backing plate and pressure plate are not directly and immediately transmitted to the flange and not materially or significantly transmitted beyond the arcuate portion 68. This advantage is also true in the case of the inner edges of the flange 66 which directly surround the apertures 84. This construction is of substantial advantage in connection with the narrow portion 85 of the bellows element.

While I have herein disclosed a preferred form of the invention, it will be understood that changes may be made therein within the spirit and scope of the appended claims.

I claim:

1. A unitary, self-contained expansion member of generally flat plate-like form for interpositioning between and sealing engagement with opposed planar members and producing working force against those members, comprising a rigid backing plate and a bellows element overlying a substantial portion of the backing plate and having a main portion of planar form substantially coextensive with its own outline size, parallel with the backing plate and spaced therefrom a distance small relative to its area, and a surrounding flange disposed at an angle to the main portion and rigidly secured to the backing plate in sealed relation thereto, forming therewith a pressure cavity, said main portion being flexible toward and from the backing plate, the bellows element, when the expansion member is placed between said opposed planar members, engaging its adjacent one of those members substantially throughout its own full area, the construction having an aperture communicating with the pressure cavity and the pressure cavity being otherwise enclosed.

2. The invention set out in claim 1 wherein the flange is disposed at said angle continuously around the main flat portion.

3. The invention set out in claim 2 wherein the flange is substantially perpendicular to the main planar portion and a transition portion of substantial radius is formed between the flange and main planar portion.

4. The invention set out in claim 1 and including a rigid pressure plate fitted to the bellows element on the side thereof opposite the backing plate and engaging the bellows element throughout substantially the area of the main planar portion of the bellows element whereby to receive the thrust of the bellows element upon expansion of the expansion member.

5. The invention set out in claim 4 wherein the wear plate is of substantially congruent size and shape with the backing plate, whereby the thrust plate can be positioned between said opposed planar members and gripped therebetween and said opposed planar members engage the wear plate and backing plate in substantial areas.

6. The invention set out in claim 5 wherein the bellows element is of lesser outline size than the backing plate and the wear plate whereby a space is provided around and outwardly beyond the bellows element, and the wear plate and backing plate may be gripped between said opposed planar members at said space outwardly beyond the bellows element.

7. The invention set out in claim 4 in which the backing plate and wear plate have aligned apertures for receiving members extending therethrough, and the bellows element includes portions of relatively narrow width extending a substantial distance around the apertures.

8. The invention set out in claim 4 wherein the bellows element extends throughout an area less than the total area of the backing plate and wear plate, leaving a void area on the backing plate, and the backing plate is provided with an embossment extending therefrom in the direction of the bellows element and engageable with the wear plate.

9. The invention set out in claim 1 wherein the flange is disposed perpendicular to the main flat portion of the bellows element, the backing plate has an aperture receiving the flange, and an insert element is disposed within the flange, the aperture in the backing plate, the flange, and the insert element all being similarly shaped and dimensioned whereby the flange is press fitted between the backing plate and insert element and retained in place thereby.

10. The invention set out in claim 9 wherein the bellows element is of substantially lesser thickness than the backing plate, the backing plate retains the flange of the bellows element in rigid position, the main flat portion of the bellows element extends substantially throughout the area of and defines the shape of the bellows element, and a continuous arcuate portion is formed between the flange and the main flat portion extending entirely around the bellows element, and upon expansion and contraction of the bellows element due to variation in pressure in the pressure cavity, the main flat portion moves from and toward the backing element and the internal flexing in the bellows element is manifested substantially entirely in the arcuate portion.

References Cited

UNITED STATES PATENTS

| | | | |
|---|---|---|---|
| 2,809,592 | 10/1957 | Miller et al. | 103—126 |
| 2,853,952 | 9/1958 | Aspelin | 103—126 |
| 3,050,010 | 8/1962 | Thrap et al. | 103—126 |
| 3,101,673 | 8/1963 | Clark et al. | 103—126 |
| 3,131,643 | 5/1964 | Marietta | 103—126 |
| 3,153,371 | 10/1964 | Miller | 103—126 |
| 3,172,369 | 3/1965 | Ballu | 103—150 |
| 3,174,435 | 3/1965 | Sisson et al. | 103—126 |
| 3,213,799 | 10/1965 | Trick | 103—126 |
| 3,294,029 | 12/1966 | Clark et al. | 103—126 |

FRED C. MATTERN, JR., *Primary Examiner.*

WILBUR J. GOODLIN, *Assistant Examiner.*